Oct. 13, 1964 R. A. HEISLER ETAL 3,152,802
THERAPEUTIC AND BODY EXERCISING APPARATUS
Filed Oct. 25, 1961 4 Sheets-Sheet 1

INVENTORS

Oct. 13, 1964 R. A. HEISLER ETAL 3,152,802
THERAPEUTIC AND BODY EXERCISING APPARATUS
Filed Oct. 25, 1961 4 Sheets-Sheet 2

INVENTORS

Oct. 13, 1964  R. A. HEISLER ETAL  3,152,802
THERAPEUTIC AND BODY EXERCISING APPARATUS
Filed Oct. 25, 1961  4 Sheets—Sheet 3
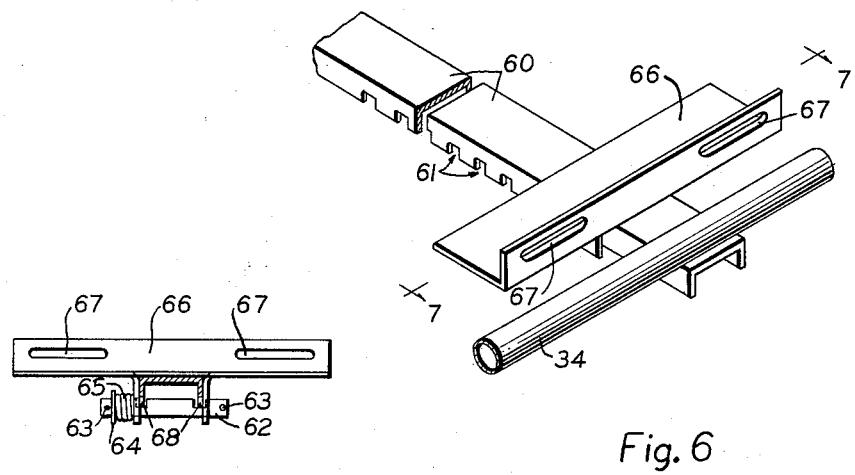
Fig. 6
Fig. 7
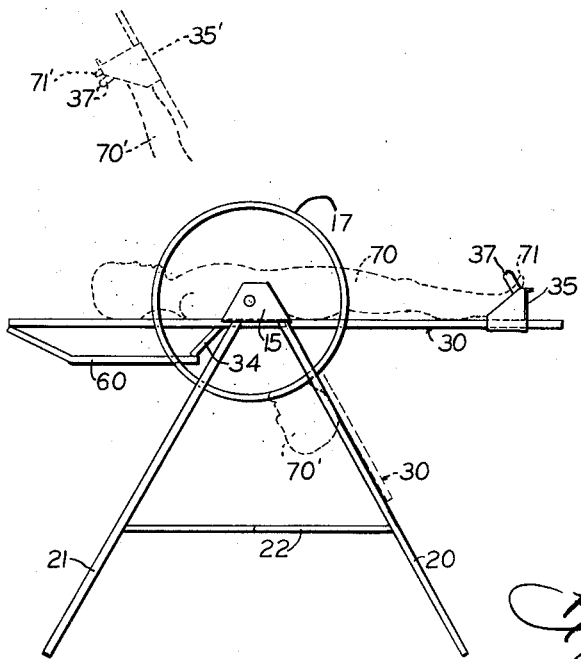
Fig. 8
INVENTORS
Raymond A. Heisler
Paul G. Eschler

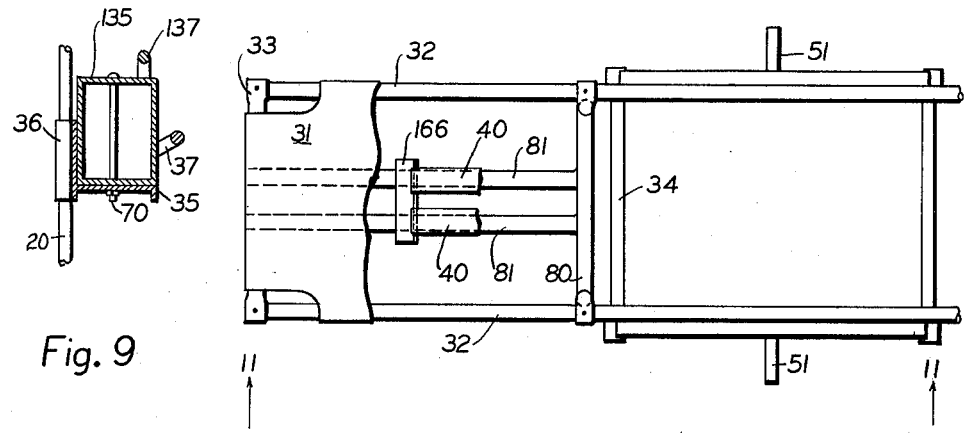
Fig. 9
Fig. 10
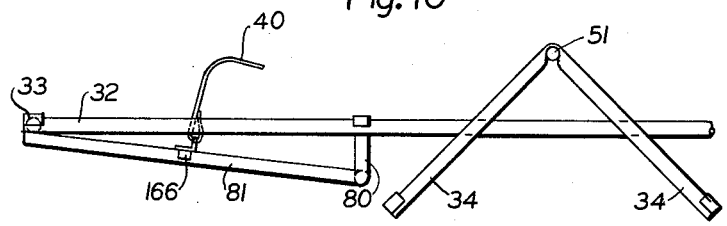
Fig. 11
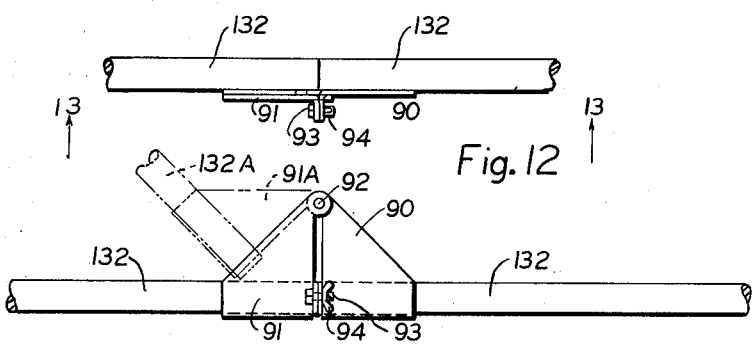
Fig. 12
Fig. 13
INVENTORS

United States Patent Office 3,152,802
Patented Oct. 13, 1964

3,152,802
THERAPEUTIC AND BODY EXERCISING
APPARATUS
Raymond A. Heisler, 122 Surrey Drive, Wayne, N.J., and
Paul G. Eshleman, 561 Stockton St., Princeton, N.J.
Filed Oct. 25, 1961, Ser. No. 147,586
8 Claims. (Cl. 272—33)

This present invention relates to a new and novel apparatus useful in therapeutic exercises and motions.

More particularly, this invention relates to that class of apparatus intended to assist the user to perform certain difficult or onerous motions and exercises of therapeutic merit. Many of these motions and exercises are such that performance thereof without apparatus assistance requires training practice of long duration.

An object of this invention is to provide means for a person to self-perform these beneficial exercises and movements as desired. Among such movements is the voluntary performance of "standing on one's head" or vertically inclining the operator's body.

A further object is to provide means for the rapid reversal of normal hydrostatic pressures within the body.

A further object is to provide apparatus that is of economical manufacture, easily stored, disassembled and shipped. Also an apparatus that is easily adaptable to the variance of the sizes of the human body, yet is of such construction as to provide a safe and readily useable support for any size operator.

A further object is to provide apparatus enabling the operator to perform a rotating exercise and motion, the speed being easily controlled by the operator.

It is further contemplated that the user of our invention in the use thereof will perform exercises and body motions that will stimulate the various muscles and body organs and in certain of these motions reverse the body so that the head will be lower than the feet thereby causing the reversing of the normal gravitational pull and effect on muscles, internal organs and body fluids.

In using our apparatus for rotational motions and in doing head stands for selected periods of time it is intended, within the physical capacity and ability of the user, to stimulate the muscles and to cause body fluids and blood to flow at an accelerated rate and in reversed directions. In addition to stimulating the general circulation and the many other physical and therapeutic benefits received in the use of our invention there is also the sheer pleasure derived in performing the various motions used in the operation of our apparatus.

In attaining these and other objects, we provide a rotatable platform supported by spaced-apart A-frames. This platform has within its sides a cover preferably of fabric and attached to these sides is a support harness designed to be adjusted to the height, size and weight of the user so that he or she may be securely strapped to the platform and held thereto both transversely and longitudinally as the platform is rotated so as to provide the various body motions. The platform, in a horizontal position, is disposed about three to four inches below the horizontal axis of the bearings that provide the rotational support for the platform. For ease of location or longitudinal prepositioning of the body to the platform so as to balance the weight of the user and platform to provide substantially a static balance to the rotatable mass at the axis of the bearings, there is also provided an adjustable step platform with a foot retaining bar, the step movable in relationship to the rotatable platform and movable with said platform.

Other objects and features characteristic of the invention, both in its novel features of construction and also its operation and arrangement of parts, will become apparent in the following specification as illustrated in the accompanying drawings wherein:

FIGURE 6 is an isometric view of a preferred form of strap adjustment mechanism;

FIGURE 7 is a sectional view on the line 7—7 of FIGURE 6;

FIGURE 8 is a side view illustrating the operation of the apparatus;

FIGURE 9 is a sectional view showing an auxiliary step and retaining bar;

FIGURE 10 is a plan view showing an alternate manner of retaining the belt ends;

FIGURE 11 is a side view on the line 11—11 of FIGURE 10;

FIGURE 12 is a fragmentary plan view showing a preferred form of hinging the platform; and FIGURE 13 is a side view on the line 13—13 of FIGURE 12.

Referring now more particularly to the drawings wherein like numerals of reference designate the same parts in each of the figures.

Figure 1:
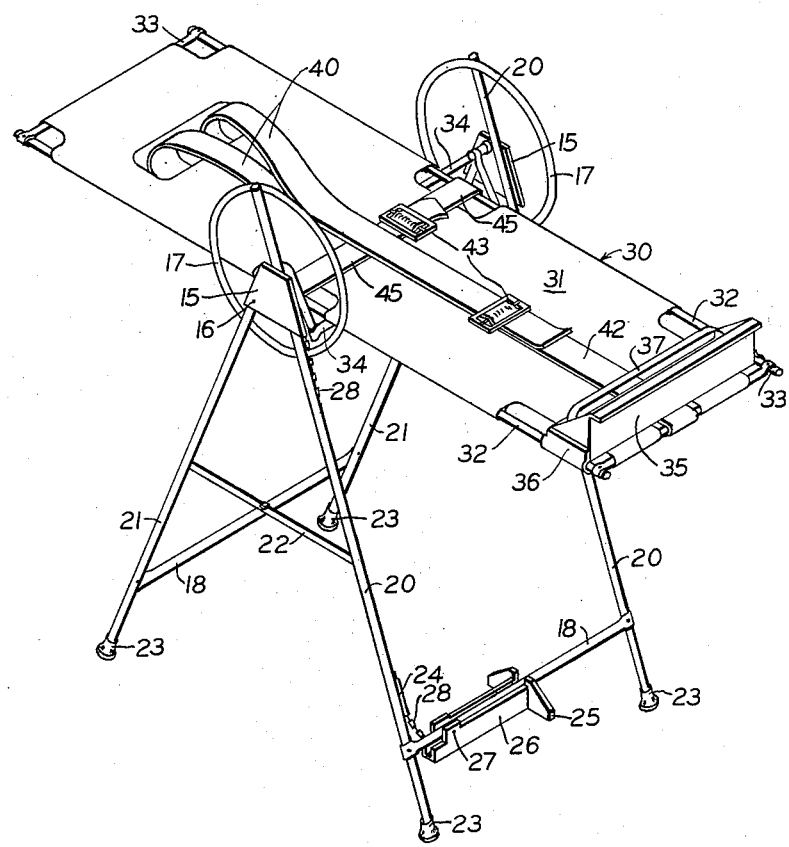
FIGURE 1 is an isometric view of an assembled apparatus.

FIGURE 1 shows a preferred form of the assembled apparatus in which the support framework comprises two interconnected A-type frames. In the construction of the preferred method, as illustrated, the leg 20 may be tubular in form, tubing being selected for both lightness and strength. To simplify construction and improve rigidity the leg element 20 is continued past the apex of the A in order to provide support for other elements described later. The other leg 21 is shown in similar tubular construction and terminates at the apex of the A. Forming the bar of the A and providing the spacing and stiffening to the two legs 20 and 21 is the stiffener bar 22. This stiffener bar 22 is preferably hinged so as to assist in storage, however if desired, the bar 22 may be made as a single element. On the lower ends of the legs 20 and 21 are tips 23 intended as an anti-slip means and to prevent unwanted marking or marring of floors. If it is deemed desirable, it is functionally equivalent to form the two legs 20 from one piece with the ends now protected by tips 23 to be connected. So also can legs 21 be formed and connected. As a further variation the formation of legs 20 and 21 could be from one element.

At the apex of the A frame is the bearing plate 15 with upper pivot pin 16 holding the end of leg 21 to the bearing plate 15. Fastened to the legs 20, 21 and extended part of leg 20 is the hand ring 17. The manner of attachment of element 17 to legs 20 and 21 is entirely optional since any conventional means such as bolting, riveting or welding may be used.

Between the A frames are cross braces 18. As with many of the other elements these cross braces 18 are shown as tubular elements with ends formed to fit the legs 20 and 21. Although this method of construction is shown for purposes of preferred illustration, many equivalent variations are possible.

Attached to one of the cross braces 18 is a latch plate 25 formed with inclined surfaces falling away from a spaced opening adapted to engage and slide on cross brace 18. Supporting the latch plate 25 is a channel arm 26 adapted to fit cross brace 18 and slidable on the brace 18. A hinge pin 27 is used to retain the channel arm 26 to the brace 18. Connected to the rear of the arm 26 is a pull chain 28 which is led through a guide tube 24 to a suitable attaching means at the apex. The operation of the latch will be more fully outlined in the elaboration of FIGURES 4 and 5.

Attached to the A frames and rotatable therein is a platform 30. This platform comprises of a cover 31, two side rails 32, two end rails 33 and two pivot support frames 34. The manner of assembly is optional but quite suitable results are obtained by using bolts and nuts providing the joints are so formed as to be nearly rigid when fastened together.

Slidable on the side rails 32 is a step platform 35. This step platform 35 is more clearly illustrated in FIGURES 4 and 5.

Attached to the platform 30 and rotatable with the said platform is a support harness. A preferred form of this harness is shown. In this illustrated form, a split upper strap 40 is attached to a slidable support bar (not shown in this figure). This upper strap 40 converges and is then made into a single strap the two upper portions of strap 40 disposed to engage and retain the shoulders of the user, each lying adjacent the neck of the user. A bottom strap 42 is attached to an end rail 33, while the other end of said strap 42 terminates in a strap fastener 43. This strap fastener 43 engages the upper strap 40 thus securing longitudinally the body of the user to the platform 30. For lateral support and to retain the middle portion of the body to the platform 30, a side belt composed of two segments 45 and another strap fastener 43 is attached to the side rails 32.

Figure 2:
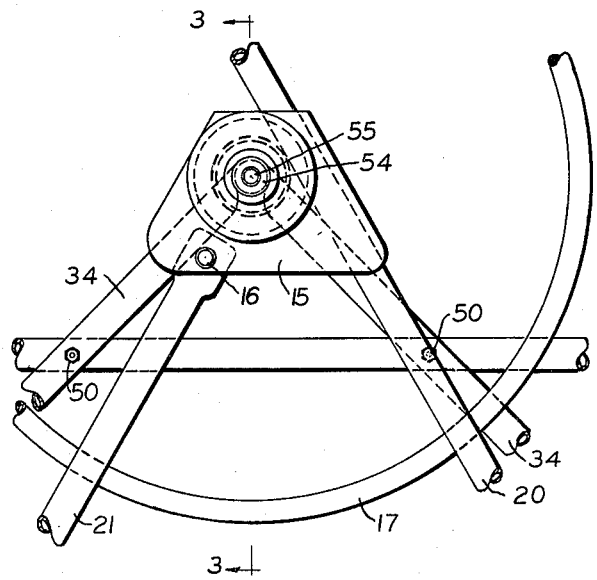
FIGURE 2 is a side view showing in enlarged detail an arrangement of a bearing assembly.
Figure 3:
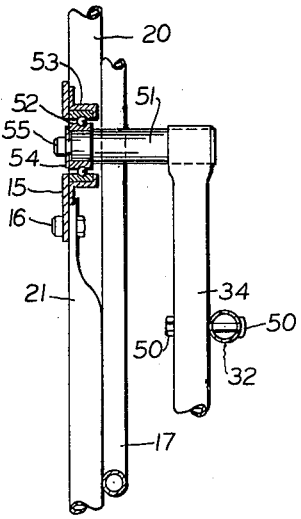
FIGURE 3 is a sectional view on the line 3—3 of FIGURE 2.

In FIGURES 2 and 3 further elements used in the suspension and rotation of the platform 30 are shown. In addition to leg elements 20 and 21, bearing plate 15 and upper pivot pin 16, the pivot support frames 34 are shown attached to the side rails 32. As a means of attachment, bolt and nut 50 illustrate a suitable means for effecting the joining together of the two elements 34 and 32. Support frame 34 is attached to trunnion pin 51 whose end is formed to fit a bearing 52. As a practical matter trunnion pin 51 is located approximately three to four inches above the platform side rails 32, this distance being a good average enabling the center of gravity of the user to be at the trunnion pin 51 at any angle at which the user places himself. To hold bearing 52 in place a retaining housing 53 is attached to the bearing plate 15. To retain the trunnion pin 51 within the bearing 52 is a washer 54 and cap screw 55.

Figure 5:
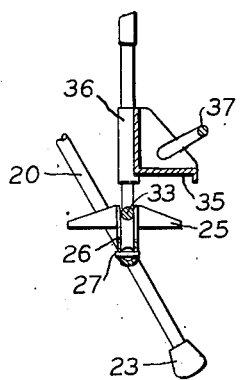
FIGURE 5 is a sectional view on the line 5—5 of FIGURE 4.
Figure 4:
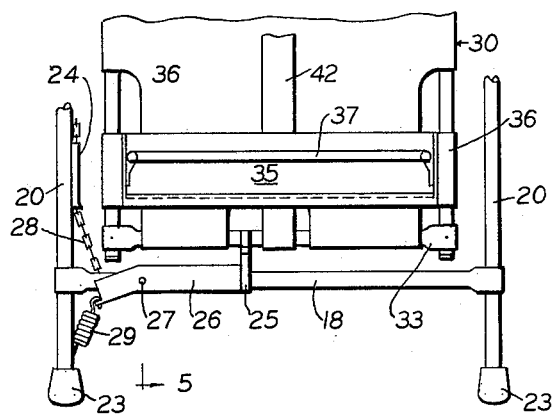
FIGURE 4 is a front view showing in enlarged detail a preferred form of latching arrangement.

In FIGURES 4 and 5 an elaboration of the latch and step elements are shown. In addition to legs 20, cross brace 18 and tips 23, the latch assembly comprising the latch plate 25, the channel arm 26, the hinge pin 27, the pull chain 28, the guide tube 24, as well as the spring tensioning element 29, is shown. FIGURES 4 and 5 show the end rail 33 encaptured in latch plate 25, which position is the so-called latched position whereby the platform 30 is restrained from being able to freely rotate. Also is shown further elements cooperating with the step platform 35. Guide sleeves 36 are slidable on side rails 32 and incorporated with each guide sleeve 36 (but not shown) is a suitable pin lock or clamping means of such design as to permit easy, variable adjustment, and lock of the step platform 35 in such desired position as to accommodate the operator or user. A retaining bar 37 is affixed to the step platform 35. This retaining bar 37 is positioned in such a manner as to permit the toe portion of the foot to extend beyond the step platform 35 and under the retaining bar 37.

In FIGURES 6 and 7 are shown a preferred form of strap adjustment mechanism. In the use of the strap harness it is sometimes found desirable to adjust the upper strap 40 so as to bring the fixed end attachment within a certain relationship to the shoulder of the user. To provide such adjustment a preferred bar and latch mechanism is shown. A slide bar 60 is attached to end rail 33 and pivot support frame 34. This slide bar 60 has formed therein notches 61 into which a latch bar 62 may engage. To retain bar 62 in place cotter pins 63 are provided on both ends and to provide a positive engagement the bar 62 is spring loaded by means of a washer 64 on the outer side and a spring 65 placed between the washer 64 and bracket 66. In bracket 66 are slots 67 for attaching the belt ends of upper strap 40.

In use, the spring 65 is compressed so that cut outs 68 in the latch bar 63 will coincide with the rails of the slide bar 60 hence enabling the sliding back and forth movement of the bracket 66 as desired by the operator. The spring 65 is then allowed to expand so that the full bar portion of bar 62 adjacent to the cut outs 68 engage the notches 61. Of course latch bar 62 is slidable in suitably formed openings in the ear extensions of the bracket 66.

FIGURE 8 is a side diagrammatic view of the apparatus showing the relative location of the user in relation to the apparatus. In addition to the various elements previously described, is the figure of the operator designated as 70 lying on the platform 30. The toes of the operator designated 71, are hooked under the retaining bar 37 and the foot rests on step platform 35. As the operator grasps the hand ring 17 and rotates the platform 30, a position such as is shown with the operator 70' may be achieved. When the operator brings the head toward the floor, the toes 71' engage the retaining bar 37'. By grasping the hand ring 17 and either pushing or pulling, the operator can thus rotate to any desired position.

FIGURE 9 shows an auxiliary step and retaining bar fitted to step platform 35. In order to provide a higher platform for children or very small people so that when they step on the step their body weight is approximately equally distributed on both sides of the trunnion 51, it is sometimes necessary that an auxiliary step be used in addition to the step platform 35. We therefore show as a preferred embodiment an auxiliary step platform 135 which rests on step platform 35. A retaining bar 137 is attached to the structure of the auxiliary step platform 135, said bar acting to provide the same function when using the auxiliary step platform 135 as does the retaining bar 37 to step platform 35 discussed above.

FIGURES 10 and 11 show an alternate manner of construction for retaining the belt ends of upper belt 40. For reasons of economy and where the amount of belt adjustment required is minimal it is often of advantage to use a support system effectively the same as shown.

FIGURE 10 is a plan view and FIGURE 11 is a side view of the alternate support arrangement. The side rails 32 are attached to the end rail 33 as described above. The pivot support framework comprising the pivot supports 34 with pivots 51 at the apex are conveniently attached to the side rails 32 as described above. Instead of slide bar 60 above two support rails 81 are attached to a cross brace 80, said cross brace being conveniently affixed to the said rails 32. Also affixed to the support rails 81 is a bracket 166 similar in function to bracket 66 above except that bracket 166 is not slidable on the support rails 81. The other end of rails 81 are attached to the end rail 33.

FIGURES 12 and 13 are illustrative of a preferred manner of enabling the platform 30 to be folded. In these illustrations FIGURE 12 is a fragmentary plan view showing a hinge joint. FIGURE 13 is a side view showing the same hinge joint. In these figures the side rail has been made two pieces each designated 132. Where the two pieces of side rail 132 abut, a hinge is placed which comprises a leaf element 90 affixed to one length of side rail 132 and a lapping leaf element 91 also attached to the other length of side rail 132. Hinge pin 92 holds the two leaf elements 90 and 91 in proper movable relationship. Portions of both leaf elements 90 and 91 are turned at right angles and in these turned portions an aligned hole is made which accepts bolt 93 and wing nut 94. When the bolt 93 and wing nut 94 are removed, a portion of the platform may turn around the hinge pin 92 so that as shown as 91A and 132A, those elements can so move as to have one half of the platform 30 lay over on the other half of the platform 30. This modification to the platform is desirable in those units designed to be readily collapsible for storage.

*Operation and Use*

As explained above, the interest and purpose of this apparatus is for the performance of various motions and exercises. For use of the apparatus, the mechanism is assembled in a manner such as illustrated in FIGURE 1. To fasten oneself into place, the end rail 33 is brought into the latch plate 25 as is shown in FIGURE 5. In this manner the platform 30 is held at an angle essentially the same as leg 20. The operator then steps onto the locked step platform 35 with his back toward the platform 30. The toes are then hooked under the retaining bar 37. The head is placed between the two parts of the upper strap 40 and the lower part of the strap 40 is tightened in strap fastener 43 attached to the bottom strap 42. The mid-section of the operator is then held to the platform 30 by bringing the side belt segments 45 together and tightening by adjusting strap fastener 43.

Thus fastened to the platform 30 the operator can then release the latch plate 25 by tightening pull chain 28 and fastening the pull chain 28 to some suitable holding means (not shown). With the latch now inoperative as to holding the platform 30 aligned with leg 20, the operator is free to turn as desired. If the operator has properly positioned himself on the platform 30, by adjusting and locking the step platform 35 in such a position that the operator balances when his hands are at his sides, the operator can now easily perform the exercises and motions intended. By raising the hands over the head the center of gravity will shift and the operator's head will go down. He can thus assume a nearly vertical position with his head being nearest the floor.

To rapidly rotate either in a clockwise or counterclockwise manner the operator pulls himself or changes his center-of-gravity by moving his arms so as to assume a nearly vertical position with the head away from the floor. By then alternately raising and lowering his arms he can "pump" himself into as rapid a rotation as is desired. This use of the change of the center-of-gravity enables the operator to vary the motions as desired.

To get out of the apparatus the operator brings himself into a nearly vertical position with head up. He then releases the pull chain 28 from the holding device allowing the latch to raise into a position so as to permit the end rail 33 to enter the latch plate 25. The operator then releases the straps by loosening the strap fasteners 43 first from the side belt segments 45 then from the upper strap 40.

If storage of the apparatus is desired, the unfastening of the various hinging operations first with stiffener bar 22, and then with the hinging of the platform 30 as shown in FIGURES 12 and 13, enables the unit to be essentially folded flat. With the apparatus as shown being made essentially from tubing and other similarly light weight elements, the easy portability of the apparatus is apparent. It is also a very easy matter to attach auxiliary wheels to either legs 20 or 21 in such a manner as to allow a rolling movement when the apparatus is lifted so as to bring the wheels into contact with the floor.

It is to be noted that if the step platform 35 is not adjusted to the proper position for the operator to be balanced, it is necessary for the operator to re-adjust the step platform 35. It has therefore been found to be a good practice for the operator to step in place on the step platform 35 and then release the platform 30 by operating the latch through the pull chain 28 operating the latch plate 25. The release of the platform 30 will indicate to the operator, by means of the swing of the platform 30, the direction of adjustment of the step platform 35. After proper adjustment the procedure of "buckling-in" as outlined above can be completed.

It is also of note that whereas the above description indicates that the apparatus is primarily intended to be used alone, this is not necessarily the case. It is sometimes found to be necessary and of advantage for an operator to be stationed adjacent to the apparatus and to manipulate the platform. This is especially true when a patient, for medical reasons, is being given a prescribed treatment of exercise or motions, and also where the patient is physically incapable of, or medically restricted to, such limited motions as are approved by the physician directing the treatment. The above description of the operation and use has been directed solely toward apparatus that is powered either by the operator and user or by an attendant operating the equipment. When the user is physically restricted from the exertions attendant upon its use, and when the securing of services of an attendant is not always convenient, the motorizing of this apparatus is then desirable.

Since the providing of an electric motor, a support bracket, suitable chain and sprockets, and a switch control is both conventional and easily accomplished, the drawings and description attendant thereto have not been made. It is however our intent to thus point out the fact that such motorizing is a practical addition in those cases where for physical or other reasons the extra expanse of making this addition is necessary or desired. It is therefore our intent to provide motorized motion wherever and whenever the occasion demands.

Although we have described our invention in detail and have utilized certain specific terms and languages in the foregoing description and the attendant advantages of the preferred embodiment of the invention, it is to be understood that changes may be resorted to in the form, construction and arrangement of the parts without sacrificing all the material advantages hereinfore described, and that such changes and modifications may be resorted to without departing from the spirit or scope of the claims appended hereto.

We claim:
1. A therapeutic apparatus for body exercise and motion comprising; (1) a platform providing a support surface for the body of the user, (2) means supporting said platform for free rotation through 360 degrees and around a horizontal axis, said means including bearing means spaced vertically above the platform surface when said surface is horizontally disposed, said platform having at least one bearing engaging member for cooperation with said bearing means; (3) a harness attached to the platform and movable therewith, the harness having adjustable strap means for longitudinally and transversely strapping the user to a selected location on the platform and for maintaining the user in this location on the platform during the rotation through any portion of the cycle, (4) an adjustable step slidable to one of several positions in relation to the platform and releasably lockable in one of these positions relative to the platform so that the step can be prepositioned relative to the platform to enable the user to establish a position on the platform whereby when the user straps himself on the platform he and the platform will be in a condition of substantially static balance, and (5) means on said step for retaining the feet of the user on the step regardless of the position of the body of the user.

2. Apparatus as in claim 1 in which the vertical distance of the bearing means above the platform is such that a theoretical line through the horizontal axis of the bearing means will pass through the body of the user at substantially the center of gravity of the body of the user, 3. Apparatus as in claim 2 in which the foot retaining means on the step is a bar member fixedly disposed above the step a distance sufficient for the user to insert his foot between the bar and step so as to retain his foot on the step.

4. Apparatus as in claim 3 in which there is provided a latch means on the platform supporting means for releasably engaging the end of the platform and restraining the free rotation of the platform while the user is mounting and dismounting and strapping and unstrapping himself from the platform, said latch means having means for selectively retaining the latch in an operative engaging position and also for selectively retaining the latch in a disengaged position for free rotation of the platform.

5. Apparatus as in claim 4 in which there is provided one or more hand rings attached to the platform supporting means so that in use they will be substantially in a vertical plane and graspable by the user to rotate himself on the platform to such a position as is desired.

6. Apparatus as in claim 5 in which the platform supporting means is provided with means for releasably locking in an erected position and for unlocking so that the support may be folded for storage, and means for releasably locking in a flat condition the platform for use and for unlocking so that the platform may be folded for storage.

7. A therapeutic apparatus for body exercise and motion comprising; (1) a platform having side and end members, (2) a covering affixed to said platform members and extending therebetween and providing a support surface for the body of a user, (3) trunnions attached to and extending from the platform side members and disposed to lie in a common axis spaced vertically above the surface of the platform, (4) a support frame having interconnected A-type frames and having bearings affixed thereto, one bearing being located near the apex of each A-frame and receiving one of said trunnions so as to support the platform in a freely rotatable manner between said A-frames and around a horizontal axis through 360 degrees, (5) a harness attached to the platform and movable therewith, the harness having adjustable strap means for longitudinally and transversely strapping the user to a selected location on the platform and for maintaining the user in this location on the platform during the rotation through any portion of the cycle, (6) an adjustable step slidable to one of several positions in relation to the platform and releasably lockable in one of these positions to the platform so that the step can be prepositioned on the platform to enable the user to establish a relative position on the platform whereby when the user straps himself on the platform he and the platform will be in a condition of substantially static balance, and (7) means on said step for retaining the feet of the user on the step regardless of the position of the body of the user.

8. Apparatus as in claim 7 in which the harness comprises a longitudinal strap having one end bifurcated so as to separate and pass over each shoulder of the user and a transverse strap mounted on the platform so as to pass over the mid-section of the strapped user.

References Cited in the file of this patent

UNITED STATES PATENTS

| | | |
|---|---|---|
| 1,783,586 | Dos Santos | Dec. 2, 1930 |
| 1,953,424 | Miller | Apr. 3, 1934 |
| 2,176,342 | Hoppe | Oct. 17, 1939 |
| 2,446,275 | Glasin | Aug. 3, 1948 |
| 2,932,038 | Sprague | Apr. 12, 1960 |
| 2,938,572 | Solloway et al. | May 31, 1960 |
| 2,973,961 | Behrens | Mar. 7, 1961 |

FOREIGN PATENTS

| | | |
|---|---|---|
| 872,089 | Great Britain | July 5, 1961 |